C. W. RICHARDS.
HUB CLAMP FOR VEHICLE WHEEL SUPPORTS.
APPLICATION FILED JAN. 29, 1910.
984,026.
Patented Feb. 14, 1911.
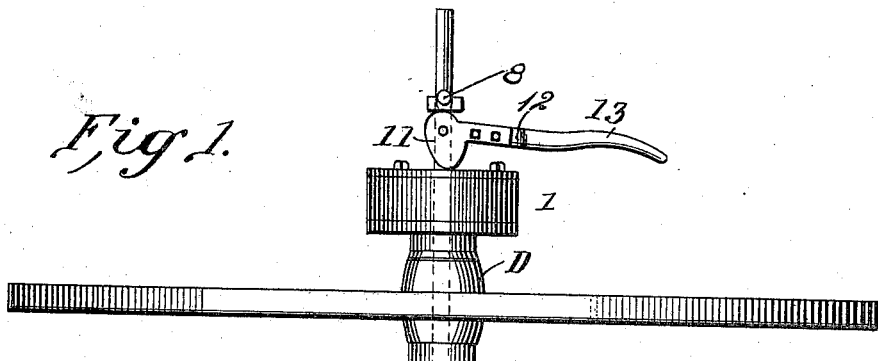
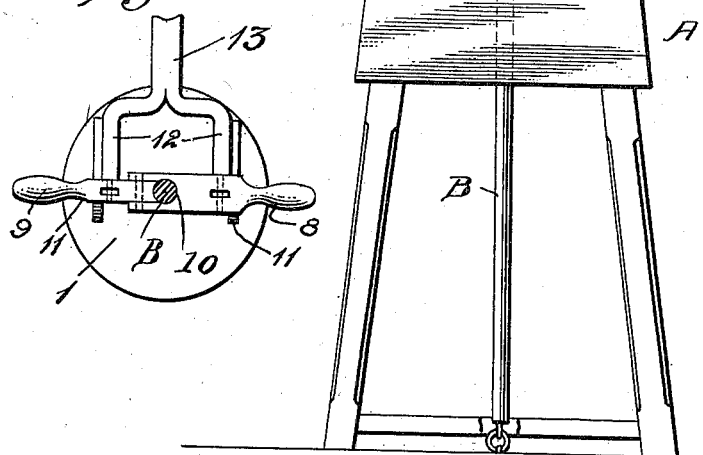
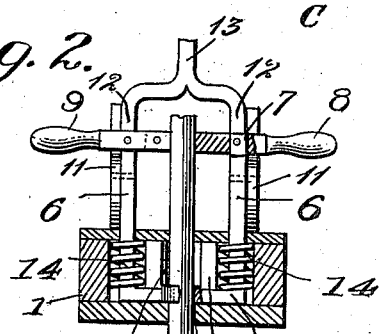
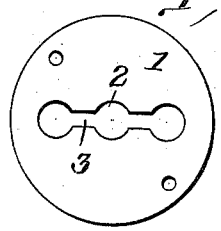

UNITED STATES PATENT OFFICE.

CHARLES W. RICHARDS, OF SLOAN, IOWA.

HUB-CLAMP FOR VEHICLE-WHEEL SUPPORTS.

984,026.

Specification of Letters Patent. Patented Feb. 14, 1911.

Application filed January 29, 1910. Serial No. 540,926.

*To all whom it may concern:*

Be it known that I, CHARLES W. RICHARDS, a citizen of the United States, residing at Sloan, in the county of Woodbury and State of Iowa, have invented certain new and useful Improvements in Hub-Clamps for Vehicle-Wheel Supports, of which the following is a specification.

My invention relates to devices for securing the hubs of wheels to wheel supports used by blacksmiths, wheelwrights and the like and has for its object the provision of a device that is quick acting, being practically instantaneous in operation both in clamping and unclamping the wheel, that is simple in construction and operation, and reasonable in cost of manufacture.

My invention will be described in detail hereinafter and illustrated in the accompanying drawings in which—

Figure 1 is a side view of a wheel support showing wheel in position and my improved hub clamp in operation, Fig. 2, a fragmental view showing the clamp in vertical section, Fig. 3, a horizontal sectional view of the clamp box, and Fig. 4 a top plan view of the box and rod clamping means.

In the drawings similar reference characters will indicate corresponding parts in the several views.

A indicates a stand of ordinary construction such as is usually employed to support wagon wheels and B a rod engaging a ring or staple C secured to the floor of the shop, said rod extending through the top of stand A and adapted to receive the hub D of a wheel E.

In the ordinary construction of wheel supports the upper end of rod B is screw threaded and a threaded hand nut or the like is employed to clamp the wheel in position by engaging hub D. Because of the necessity of unscrewing the hand nut from the rod and rescrewing it each time a wheel is removed and another placed the use of this type of machine has been found objectionable because of the time consumed in clamping and releasing the wheel hub.

In my improved device the upper end of rod B may be formed without screw threads as shown, the clamp consisting of the instrumentalities hereinafter described.

The clamp block 1 is formed in two parts as shown, and has a central opening 2 to receive rod B. The lower portion of block 1 is provided with a central elongated socket 3 to receive a U shaped member 4 having a hole 5 to receive rod B, while its arms 6 extend through openings in the top portion of the block and have reduced bearing surfaces 7 on their upper ends.

The rod clamp consists of two levers 8 and 9 pivotally secured intermediate of their ends to the reduced portions 7, the lever 8 having a bifurcated end 10 to receive the rod B while the end of lever 9 is secured between the ends of the bifurcated portion, this construction being such that when the levers 8 and 9 lie on the same plane the rod B is not engaged by the notch of the bifurcated portion 10 and the end of lever 9 but when the free ends of the levers are moved upwardly the rod B is securely clamped by the levers.

11 indicates cam-shaped disks journaled on the outer sides of arms 6 and secured to the forked ends 12 of a lever 13. 14 indicates coil springs mounted on arms 6 and bearing against the inner side of the top portion of block 1.

In operation the wheel is placed in position with the rod B extending through the hub and the block 1 placed on top of the hub so that the rod B extends through the block and between the ends of levers 8 and 9 and the block comes to rest on the top of the hub. The lever 13 is swung downwardly rotating the disks 11 so that their widest portions engage the outer ends of levers 8 and 9 and the top of block 1. The first effect of this operation is to swing the outer ends of the levers 8 and 9 upwardly so that their inner ends clamp the rod B, then the block 1 is actuated downwardly against the resistance of springs 14 so as to clamp the hub between the top of stand A and said block 1. To release the device the lever 13 is swung upwardly releasing pressure on springs 14 so that the block 1 is lifted and levers 8 and 9 swung out of engagement with rod B and the device may be removed.

Having thus described my invention what I claim is:—

1. In a hub clamp for wheel supports, a stand, a rod extending through the stand and adapted to receive the wheel hub, a block loosely engaging said rod, a U-shaped member mounted in said block and having its arms extended above the block, levers pivotally secured to the free ends of said arms and adapted to engage the rod aforesaid, and means to actuate said levers into clamping engagement with the rod and the block into engagement with the hub.

2. A hub clamp for wheel supports, comprising a stand, a rod extending through the stand and adapted to receive the wheel hub, a block loosely engaging said rod and having an elongated transverse socket therein, a U-shaped member mounted in said socket and having its arms extended outside of the block, levers pivotally secured to the ends of said arms, one of said levers having a bifurcated end to receive the rod aforesaid and the end of the other lever pivotally secured between the bifurcated ends, cams journaled on the ends of said U-shaped member and engaging the levers and block aforesaid, a lever secured to said cams, and coil springs mounted on the arms of the U-shaped member and engaging the interior of the block.

In testimony whereof I hereto affix my signature in the presence of two witnesses.

CHARLES W. RICHARDS.

Witnesses:
W. D. BUCKLEY,
C. L. RICHARDS.